No. 11,827. Reissued June 5, 1900.

O. CARPENTER.

MEANS FOR INDICATING MOVEMENT OF FLUID (Application filed Nov. 6, 1899.)

WITNESSES:

Donn Pritchell

Rud. J. Hoffman

INVENTOR

Orville Carpenter

BY Munn & Co.

ATTORNEYS

UNITED STATES PATENT OFFICE.

ORVILLE CARPENTER, OF PAWTUCKET, RHODE ISLAND, ASSIGNOR OF ONE-HALF TO JAMES M. CARPENTER, OF SAME PLACE.

MEANS FOR INDICATING MOVEMENT OF FLUID.

SPECIFICATION forming part of Reissued Letters Patent No. 11,827, dated June 5, 1900.

Original No. 594,323, dated November 23, 1897. Application for reissue filed November 6, 1899. Serial No. 736,076.

*To all whom it may concern:*

Be it known that I, ORVILLE CARPENTER, of Pawtucket, in the county of Providence and State of Rhode Island, have invented a new and Improved Means for Indicating Movement of Fluid, of which the following is a full, clear, and exact description.

The invention relates to fire-sprinklers and other apparatus containing a fluid normally dormant, but adapted to flow when a valve or other device is opened, and to apparatus containing a fluid normally in motion and liable to have its flow interrupted.

The object of the invention is to provide a new and improved means for indicating the movement of a fluid contained in a pipe, boiler, or other apparatus and whereby an alarm is automatically given whenever the fluid is flowing.

The invention consists of certain parts and combinations, as will be fully described hereinafter and then pointed out in the claims.

Reference is to be had to the accompanying drawings, forming a part of this specification, in which similar characters of reference indicate corresponding parts in all the figures.

Figure 1:
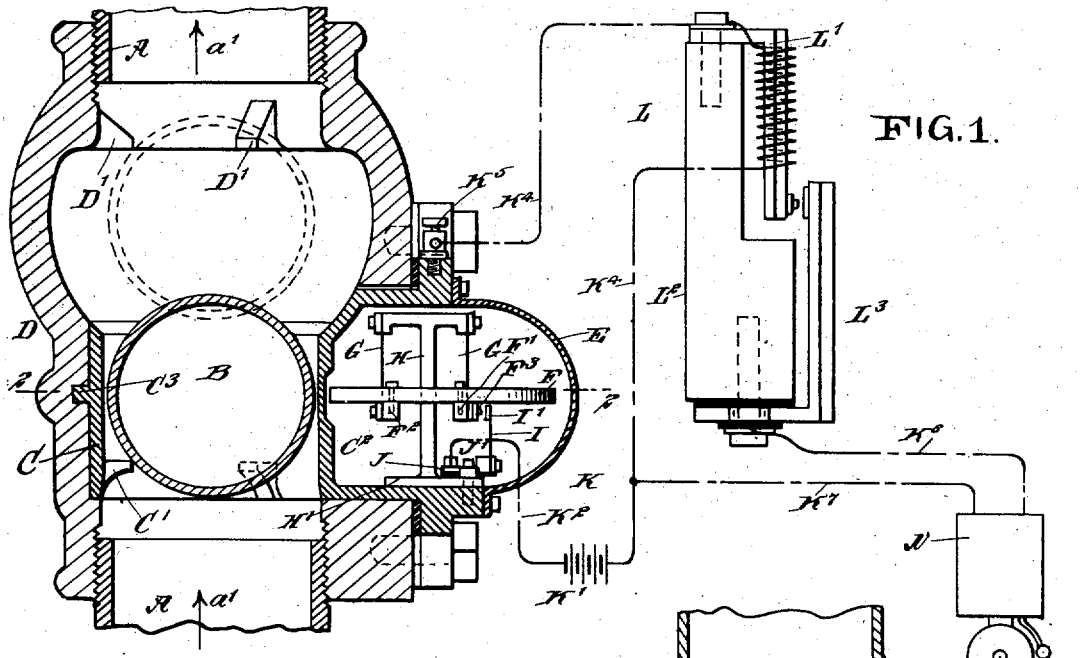
Figure 2:
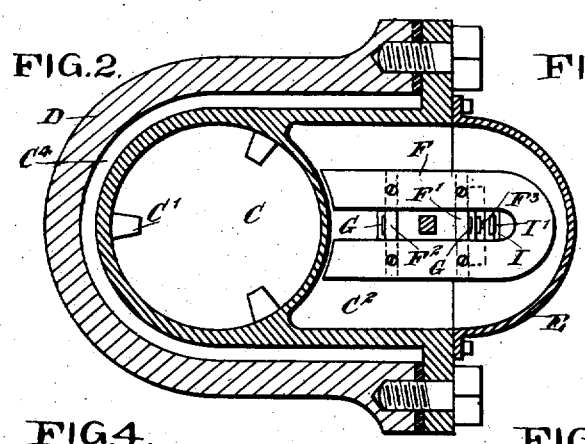
Figure 4:
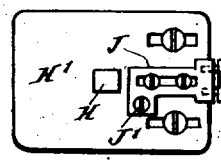
Figure 3:
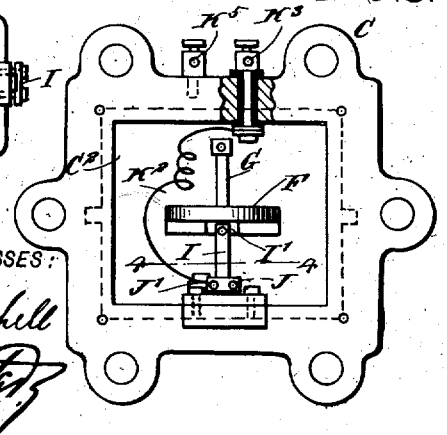

Figure 1 is a sectional side elevation of the improvement as arranged on the supply-pipe of a water-sprinkling system. Fig. 2 is a sectional plan view of the same on the line 2 2 of Fig. 1. Fig. 3 is a face view of the casing containing the magnet and other parts of the electric circuit. Fig. 4 is a sectional plan view of part of the same on the line 4 4 of Fig. 3; and Fig. 5 is a sectional side elevation of a modified form of the improvement with the supply-pipe in section.

Figure 5:
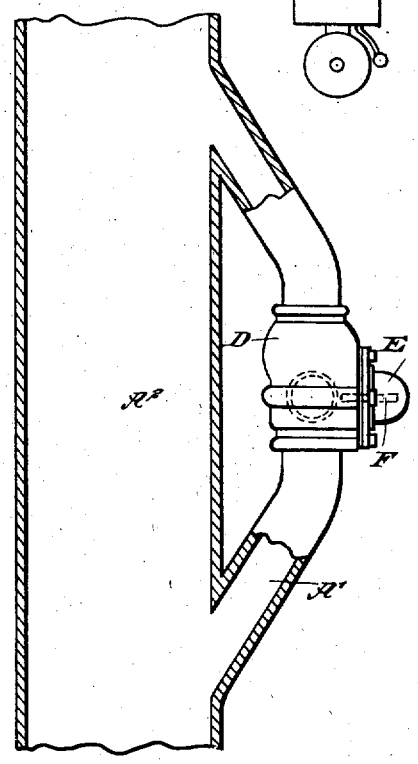

The improved device may be connected directly with a supply-pipe A, as illustrated in Figs. 1 and 2, or with a branch pipe A′, connected at both ends with a supply-pipe $A^2$, as illustrated in Fig. 5. In either case the device is provided with a magnetic body B, preferably made of iron in the shape of a hollow ball, normally resting on lugs C′, projecting from the inside of a non-magnetic casing C, attached to a casting D, arranged in the pipe A and containing near its upper end lugs D′ for limiting the traveling movement of the body B when the fluid contained in the pipe flows in the direction of the arrow *a′* and carries the body with it to the said lugs, as indicated by dotted lines in Fig. 1.

The casing C is formed with an external chamber or recess $C^2$, closed by a removable cap E, and in this chamber is suspended a magnet F by flexible strips G, secured at their upper ends to the top of a bracket H, attached to the bottom of the chamber $C^2$, as shown. The poles of the magnet F are in close proximity to the external surface of the casing C, as indicated in Figs. 1 and 2, at such a point as to bring the body B into the field of the said magnet during the time the body is at rest on the lugs C′, it being understood that the casing C is made of brass or other suitable non-magnetic material, while the body B is made of iron or the like, and consequently influences the magnet upon moving out of or into the field of said magnet, and which field extends through the wall of the non-magnetic casing C to the inside thereof.

The strips G are preferably secured to transverse bars F′ $F^2$ of the magnet F, the bar F′ carrying a contact-point $F^3$, normally out of engagement with a contact-point I′, formed on a plate I, secured at its lower end to a plate J, secured to but insulated from the base H′ of the bracket H, as shown in Fig. 1. The plate J is adjustably held on the base H′ to permit of bringing the contact-point I′ the desired distance from the contact-point $F^3$ during the time the magnet F is in an innermost position, held there by the body B as long as the latter rests on the lugs C′ and is within the field of the magnet.

Now when the fluid contained in the pipe A flows in the direction of the arrow *a′* and carries the body B with it then the latter moves out of the field of the magnet F, and the latter swings outward and the contact-point $F^3$ moves in contact with the point I′ to close an electric circuit K, containing a battery K′, a double thermostat L, and an alarm-bell or other sounding device N, controlled by the thermostat L. The wire $K^2$ of the circuit K is connected with the binding-post J′ on the plate J and with the insulated post $K^3$, attached to the casing C, as shown in Fig. 3, then passes to the battery K′, the return-wire $K^4$ being wound around one thermostat L′, held on the casing $L^2$, and then passes to a binding-post $K^5$, attached to the casing C. The other thermostat $L^3$ is insulated on the casing $L^2$ and is connected by a wire $K^6$ with the alarm-bell N, connected by a wire $K^7$ with the wire $K^4$. When the contact is made at the points $F^3$ and I′ at the time the body B has moved out of the field of the magnet F, then the primary circuit is closed and the thermostat L′ is gradually heated, whereby it is caused to expand and finally make contact with the other thermostat $L^3$ and close the secondary circuit for the alarm-bell N, so that the latter is sounded. The thermostat L is preferably employed only in case the normally-dormant fluid is frequently disturbed by a hammering or surging action of the fluid, whereby the body B is only moved for a short time from the field of the magnet F and then returns immediately to the lugs C′ back into the field of the magnet. In such a case the closing of the circuit K does not sound the alarm-bell N, as the thermostat L′ is not sufficiently heated during the time the body B moves from and back to its seat, and the thermostats L′ and $L^3$ do not close the circuit for the alarm-bell N; but in case the flow in the supply-pipe A is for the length of time to which the thermostats L′ and $L^3$ are set then the closing of the circuit K finally causes a contact of the thermostats L′ and $L^3$, and the circuit of the alarm-bell is closed and the alarm is sounded.

From the foregoing it is evident that the thermostats are a responsive device responding only to an excessively-prolonged current; but when a hammering or surging action of the fluid in the pipe A takes place then the sounding of the alarm is retarded, as the secondary circuit is not closed until the lapse of the predetermined time—that is, the time to which the thermostats are set—as above stated. Thus there is a direct relation between the moving body in the fluid and the thermostatic device inasmuch as the latter is controlled by the duration of time during which the body is away from its seat. As a result the electromagnetic alarm or indicating device is retarded in its action to prevent giving an alarm or denoting the movement of the movable member or body B in the pipe A as long as only a hammering or surging action of the fluid in the pipe A takes place; but when the member or body B is actuated for a predetermined length of time by an excessively-prolonged flow of current then the retarding action of the thermostats to the sounding of the alarm is overcome and the alarm is sounded after the lapse of the predetermined length of time. The relative specific gravities and the iron body B give the result that the pressure of the moving fluid displaces the body similarly to the action of a piston within a cylinder; but it should be stated that the function of the thermostatic device in governing the time elapsing before the alarm is sounded is not dependent upon the relative gravities, one of the purposes of the iron body being that it tends to resist incipient hammering and contributes to safeguarding the alarm against accidental sounding, and while the thermostatic device is thoroughly affected by such a pronounced hammering as will tend to displace the body it will not be effectively responsive to the current induced by such hammering, but will become active only by an excessively-prolonged flow of the current. It is understood that I do not confine myself to the particular form of the responsive and retarding device shown and described, as it is evident other electrical or mechanical means could be substituted for the thermostats.

The casing C is preferably provided with an external rib $C^3$, fitted into a corresponding recess $C^4$ in the casing D to securely hold the casing in place and to permit of properly fitting the casing into the casting D.

The lugs D′ are so arranged that when the body B is rested thereon the flow of the water in the pipe is not appreciably obstructed.

From the foregoing it is understood that the device may be used for various other purposes than the one mentioned—for instance, such as a low-water alarm for boilers, in which case the construction of the device will be altered from the one shown and described without, however, deviating from the spirit of my invention. The arrangement may also be such that the body B is held normally out of the field of the magnet F and the circuit is closed, and when a disturbance of the water causes a sinking of the body B into the field of the magnet F then the position of the latter is disturbed and the circuit is broken to sound an alarm.

It is further evident that the magnet may be used to release a clockwork for actuating an alarm, or other mechanical means may be controlled by the magnet for the same purpose.

It is also evident that the arrangement described may be reversed—that is, the body in the fluid may be the magnet to influence the magnetic body on the outside of the casing whenever the magnet moves in the fluid and the outside body is in or out of the field of the magnet.

Having thus fully described my invention, I claim as new and desire to secure by Letters Patent—

1. A device of the class described, comprising a body in a fluid, the body being heavier than the fluid and arranged to be moved by the pressure of the fluid when the fluid is in motion, and a magnet exterior of the said fluid and body and so arranged that the body may come within and leave the field of said magnet, to cause a disturbance thereof, substantially as shown and described.

2. A device of the class described comprising an electromagnetic alarm or indicating device, and a body normally at rest in a fluid and in the field of the magnet of the alarm or indicating device, the body being heavier than the fluid and adapted to be moved by the pressure of the same out of the field of the said magnet to cause a disturbance of the latter and thereby operate the alarm or indicating device, substantially as described.

3. A device of the class described, comprising an electromagnetic alarm or indicating device, a body normally at rest in a dormant fluid and in the field of a magnet of the said alarm, the body being heavier than the fluid and the said body being moved by the direct pressure of the fluid out of the field of the said magnet, to cause a disturbance of the latter so that the alarm or indicating device is actuated, and a responsive device in the circuit of the said alarm or indicating device and controlling the sounding or indicating device thereof, substantially as shown and described.

4. An indicator having a casing, a portion of which is adapted to have a fluid moved through it, a magnetic body normally carried within said portion of the casing and closing the same and capable of being forced out of said portion of the casing, and a magnetic alarm or indicating device actuated by the magnetic body, substantially as described.

5. An indicator having a magnetic body adapted to be moved by a fluid, the magnetic body being heavier than the fluid, and a magnetic alarm or indicating device actuated by the magnetic body, substantially as described.

6. An indicator having a casing with two chambers one of which is adapted to have a fluid moved through it, a magnetic body seated within said chamber and loosely engaging the sides thereof so that the fluid on passing through the chamber will force the magnetic body from its seat, and a magnetic alarm or indicating device actuated by the magnetic body, substantially as described.

7. A device of the class described, comprising an electromagnetic indicating device, a body normally at rest in a fluid and in the field of the magnet of the indicating device, said body being heavier than the fluid and adapted to be moved by the fluid out of the field of the said magnet to cause a disturbance of the latter and thereby operate the indicating device, and a retarding device for the indicating device to prevent the latter from indicating until the body has been held out of the field of the magnet by the fluid for a predetermined length of time, substantially as described.

8. A device of the class described, comprising an electromagnetic indicating device, a body normally at rest in a fluid and in the field of the magnet of the indicating device, said body being heavier than the fluid and adapted to be moved by the fluid out of the field of the said magnet to cause a disturbance of the latter and thereby operate the indicating device, and a thermostatic retarding device for the indicating device to prevent the latter from indicating until the body has been held out of the field of the magnet by the fluid a predetermined length of time, substantially as described.

ORVILLE CARPENTER.

Witnesses:
J. E. OSGOOD,
A. F. ANDERSON.